US012116812B2

(12) United States Patent
Favoni

(10) Patent No.: US 12,116,812 B2
(45) Date of Patent: Oct. 15, 2024

(54) DOUBLE LEAF ADHESIVE HINGE

(71) Applicant: Andrea Favoni, Como (IT)

(72) Inventor: Andrea Favoni, Como (IT)

( * ) Notice: Subject to any disclaimer, the term of this patent is extended or adjusted under 35 U.S.C. 154(b) by 0 days.

(21) Appl. No.: 18/037,788

(22) PCT Filed: Nov. 5, 2021

(86) PCT No.: PCT/IB2021/060255
§ 371 (c)(1),
(2) Date: May 19, 2023

(87) PCT Pub. No.: WO2022/149009
PCT Pub. Date: Jul. 14, 2022

(65) Prior Publication Data

US 2023/0399882 A1 Dec. 14, 2023

(30) Foreign Application Priority Data

Jan. 8, 2021 (IT) ........................ 202021000000080

(51) Int. Cl.
*E05D 1/00* (2006.01)
*E05D 1/02* (2006.01)

(52) U.S. Cl.
CPC .......... *E05D 1/02* (2013.01); *E05Y 2600/526* (2013.01)

(58) Field of Classification Search
CPC ... B64C 1/1423; B64C 1/1407; B64C 1/1461; E05B 65/06; E05B 47/006; E05D 1/00;
(Continued)

(56) References Cited

U.S. PATENT DOCUMENTS 4,163,303 A * 8/1979 Hanna ........................ E05D 9/00 24/444
4,619,304 A * 10/1986 Smith ................. G09F 15/0068 16/226

(Continued)

FOREIGN PATENT DOCUMENTS

EP 3553263 A2 10/2019
FR 2339724 A1 8/1977

(Continued)

OTHER PUBLICATIONS

PCT Search Report in PCT/IB2021/060255 dated Feb. 11, 2022.
IPRP in PCT/IB2021/060255 dated Apr. 19, 2023.

*Primary Examiner* — Chuck Y Mah
(74) *Attorney, Agent, or Firm* — Manelli Selter PLLC; Edward Stemberger

(57) ABSTRACT

The object of the present invention is an improved double leaf adhesive hinge for fixtures, shutters, hatches or similar formed by one or more bodies and capable to operate a rotational join between two elements by using a series of alternated folds on the front and back of the element itself, as an alternative to the standard rotating pivots or hinges, operative in order to enable to open or rotate said elements even up to 360°. Preferably, the single body is shaped and is applicable by means of a simple adhesive application, to one or more angular or linear sides, in order to enable to join fixtures and shutters or similar with specific rotation functions of the same. The elements joined by the hinge according to the invention rotate by the alternation of one or more pairs of hinges, formed by folds, positioned one opposite to the other thereby forming a double Z (Zed) system translated, and not overlapped.

20 Claims, 9 Drawing Sheets

(58) Field of Classification Search
CPC .. E05D 1/02; E05D 1/04; E05D 7/009; E05D 7/081; E05F 1/00; E06B 3/325; E06B 3/362; F16C 11/12; E04B 2/7429; Y10T 403/54; B64D 11/02; E05C 19/001; E05Y 2900/114; E05Y 2900/502; E05Y 2900/531; E05Y 2600/526
See application file for complete search history.

(56) References Cited

U.S. PATENT DOCUMENTS

| | | | | |
|---|---|---|---|---|
| 4,976,075 | A * | 12/1990 | Kaveckis | E04B 1/3441 52/92.2 |
| 5,355,555 | A | 10/1994 | Zarelius | |
| 7,328,481 | B2 * | 2/2008 | Barnett | E05D 3/12 16/227 |
| 2016/0177605 | A1 * | 6/2016 | Howell | E05D 1/00 16/227 |
| 2019/0292825 | A1 * | 9/2019 | Smithson | B64C 1/1407 |

FOREIGN PATENT DOCUMENTS

| | | | | |
|---|---|---|---|---|
| JP | 2001262747 | A * | 9/2001 | E05D 1/02 |
| WO | WO-9902807 | A1 * | 1/1999 | E05D 1/00 |
| WO | WO-2010125145 | A1 * | 11/2010 | A61F 2/4241 |

* cited by examiner

DOUBLE LEAF ADHESIVE HINGE

TECHNICAL FIELD OF THE INVENTION

The object of the present invention is an improved double leaf adhesive hinge for fixtures, shutters, hatches, or similar. The hinge is particularly apt to engage elements to be relatively rotated, such as lightweight panels.

PRIOR ART

Nowadays, hinges for fixtures and shutters, which generally comprise: a containment body, a pivot-holding unit inserted in a respective seat, means for adjusting the arrangement, position, center spacing which are often difficult to assembly, are known. The containment body consists of a single piece, the interior thereof defines a seat for the pivot-holding unit.

Such known hinges, even though they are appreciated and are common, have some inconveniences. A first inconvenience resides in the fact that the containment body, the pivot-holding unit and the adjusting elements are all separated elements which must be assembled and adjusted making the assembling and fixing steps both time and labor intensive, to the detriment of the final cost of the product.

Another limit of the known-type common standard hinges is represented by the technical/constructive characteristics which do not enable a rotation of the joined elements, fixtures, shutters, hatches or similar up to 360°.

Another limit of the common known-type standard hinges is that such solutions are often not compatible with lightweight thickened materials, such as expanded polystyrene and hollow core panels which badly accept screws, nuts or pins.

OBJECTS OF THE INVENTION

The task of the present invention consists of making an adhesive hinge for fixtures, shutters, hatches or similar capable of obviating the cited inconveniences and limits of the prior art.

In the scope of such task, an object of the invention consists of providing an improved adhesive hinge which is simpler and more ready-to-assemble than the prior art hinges.

A further object of the invention consists of providing an improved adhesive hinge easily and intuitively manageable not only by an installer but also by anybody, and without using known tools, such as Allen wrenches and screwdrivers.

This task, and also these and other objects which will better appear in the following are met by an adhesive hinge for fixtures and shutters, comprising at least one body, preferably a single shaped body or a plurality of bodies, made of any material, provided that is compatible with the specific use, and besides that with any size and shape, according to the needs and the state of the art.

SUMMARY OF THE INVENTION

The invention refers to a hinge configured to enable a relative rotation of at least two elements engaged with the hinge itself, according to two different directions or types of rotation (double rotation); the hinge is characterized by comprising two types of folds different from each other. Under conditions of use of the hinge, the hinged elements can relatively rotate both clockwise and counterclockwise. Each fold cooperates with each fold of the other type both in the clockwise rotation and in the counterclockwise rotation.

The hinge obtains such double rotation by providing at least two folds of a type different from each other, each of them acts as a hinge unit and preferably is in the shape of a "Z". The folds of different type exhibit a specular or reciprocally inverted configuration; this enables a relative rotation of the hinged elements in the two senses of rotation. Providing two folds having a specular or inverted configuration, each of them being in the shape of a "Z", and that alternate along a longitudinal direction K (which in the configuration with a single body is defined by the main development direction of the central portion of the body while in the configuration with plural bodies is defined by the direction of sequence of the bodies; see respectively FIGS. 2*a* and 2*b*) enables the hinge to be, according to a front view, in the shape of a "double Z" (FIG. 3).

As hereinbefore discussed, the shaped body can be a single body (in other words, a single, monolithic piece). Whether said body is single or not, it can be made of an adhesive material from the beginning or an adhesive band, making it integral and useable with the elements to be joined, can be applied to it.

Said single body uses a series of alternated folds, for example on the front and on the back, as alternatives to the standard pivots (FIG. 6).

The elements, joined by an adhesive system of the hinge, preferably a double-sided system, rotate through and by the alternation of two pairs of hinges (two pairs of a hinge unit), formed by folds, positioned one opposite to the other in order to form a double Z (Zed) system translated (offset, in other words in which the hinge units of first type and second type, forming respectively "one Z" of the "double Z", longitudinally follow each other along a central portion of the body/bodies of the hinge), and not overlapped (in other words not when the "two Zs" are overlapped on each other, see FIG. 3). The adhesive system has the double function of gripping (adhesively engage) the element and also holding it in position with respect to the other joined movable elements. The rotation about the axis Y (FIG. 1) is enabled by the presence of folds of the body of the adhesive hinge by which one or more hinged elements are freely rotatable with a constant abutment (consequently with a stable engagement).

Moreover, the invention refers to: an assembly comprising at least one hinge and two hinged elements or two elements to be hinged by said hinge, a use of the hinge and to the process of manufacturing the hinge. The steps of the process can be described in the following referring to characteristics of the hinge (cutting, shaping, making adhesive, folding and portions to be folded, etcetera).

Conventions and Definitions

In the context of the present disclosure, one or more of the following definitions and conventions can be applied, as required:

- "double leaf hinge" means a hinge configured to relatively rotate two elements which the hinge is engaged with by an angle up to 360°;
- "adhesive hinge" means a hinge configured to be adhesively engaged to at least one element, preferably to both elements to be rotated. The adhesive hinge can be provided with an adhesive system already provided in the manufacturing step (preferred embodiment) or can be made adhesive, after its manufacture, for example before using it;

"element" which the hinge can be engaged with means a fixture, a shutter, a hatch, panel, tubular or similar, or a portion thereof (this list is clearly illustrative and non-exhaustive); in the present text, it is made reference to such elements also as "hinged elements", "pivoted elements" and similar expressions. Preferably, the elements to be hinged by the hinge are of a lightweight type, wherein the wording lightweight element (particularly panel) means an element (or panel) having a weight ranging from few kilos or less than ten kilos; such mass, therefore the corresponding weight, can be understood as mass/weight by linear meter of the length of the hinge (mass/weight unit by length unit);

a "fold" operatively acts as a hinge, in other words it enables a rotation in both senses of rotation of one of the two hinged elements with respect to the other; in the present text, each "fold", as required and in order to not mistake it for the "hinge" device the fold is part of, can be defined as "hinge unit";

"alternated folds" or "alternateable folds" means folds which can be alternatively arranged, in other words according to a determined alternation. The alternation is defined between folds of different type, particularly between folds of (at least) two types; folds of a first type can therefore be alternated with folds of a second type. The hinge shown in the attached figures provides folds of two types that are different (specular) from each other; by convention, they are indicated as "type A" folds (or also as "a", "A", "Z.a" or "A Zed", the latter wording being used when the folds are in a flat or unfolded or partially folded configuration) and "type B" folds (or also as "b", "B", "Z.b" or "B Zed", the latter wording being used when the folds are in a flat or unfolded or partially folded configuration); one or more type A folds are alternated with one or more type B folds (see FIGS. 5, 6, and 9*b*);

"adhesive" means "configured to adhere" (for example by an adhering or gluing substance or by analogous means); analogous reasoning can be applied, mutatis mutandis, to terms such as "adhesively", "make adhesive" and similar.

DESCRIPTION OF THE DRAWINGS

Further characteristics and advantages of the invention will better appear from the description of preferred, but non-exclusive, embodiments of the hinge improved according to the invention, illustrated, in an indicative and non-limiting way, in the following drawings, wherein:

FIG. 6 shows an assembly according to the invention, wherein panels are hinged to each other by a pair of type A hinge units and by a pair of type B hinge units. In this exemplifying but non exhaustive representation, the hinge shows the possibility of rotating the two panels up to 360° both in a sense and in the opposite one; regarding the 360° rotation, please see the sequence of the two configurations of the panels illustrated as closed "as a book" (see the two illustrations between the "B in operation" and "A in operation"). As shown in FIG. 6, during the anticlockwise rotation (leftward, see the sequence of the "neutral step" with "B in operation") of the panel the pair of type B hinge units mainly operate (please note that such pair operate also in the clockwise rotation of the panel for returning to the "neutral step"), while in the clockwise rotation (rightward; see the sequence of the "neutral step" with the "A in operation") of the panel the pair of type A hinge units mainly operate (please note that such pair operates also in the anticlockwise rotation of the panel for returning to the "neutral step");

FIG. 10*f* shows that the hinge can be applied, as an alternative to on the sides of both the elements to be hinged (FIGS. 10*a*-10*e*), to an element on a main surface or face transversal to its sides (left panel in FIG. 10*f*), such as a front or back surface thereof, and to the other element on a side thereof (right panel in FIG. 10*f*);

FIGS. 11*a*-11*e* show respective hinges enabling the following types of engagement, defined by specifically referring to the type of shape of the hinged elements: FIG. 11*a* shows the "round with round" engagement, FIG. 11*b* shows the "round on square" engagement, FIG. 11*c* shows the "concave and convex" engagement, FIG. 11*d* shows the engagement between "rounds of different diameters" and FIG. 11*e* shows the "round and square with different size" engagement;

FIGS. 12*a*-12*c* show respective hinges enabling the following types of engagement, defined by referring to the shape of the hinged elements: FIG. 12*a* shows the "tube on tube" engagement, FIG. 12*b* shows the "revolution fulcrum" engagement (the fulcrum being indicated at the center of the tube circumference) and FIG. 12*c* shows the "tube on panel" engagement.

DETAILED DESCRIPTION OF EMBODIMENTS OF THE INVENTION

With reference to the cited figures, the double leaf adhesive hinge, according to the invention, is generally indicated by the numeral reference 1, in its possible embodiments and is configured for any type of hinging of elements 21 with the possibility of a relative rotation of the hinged elements up to 360°.

Figure 2A:
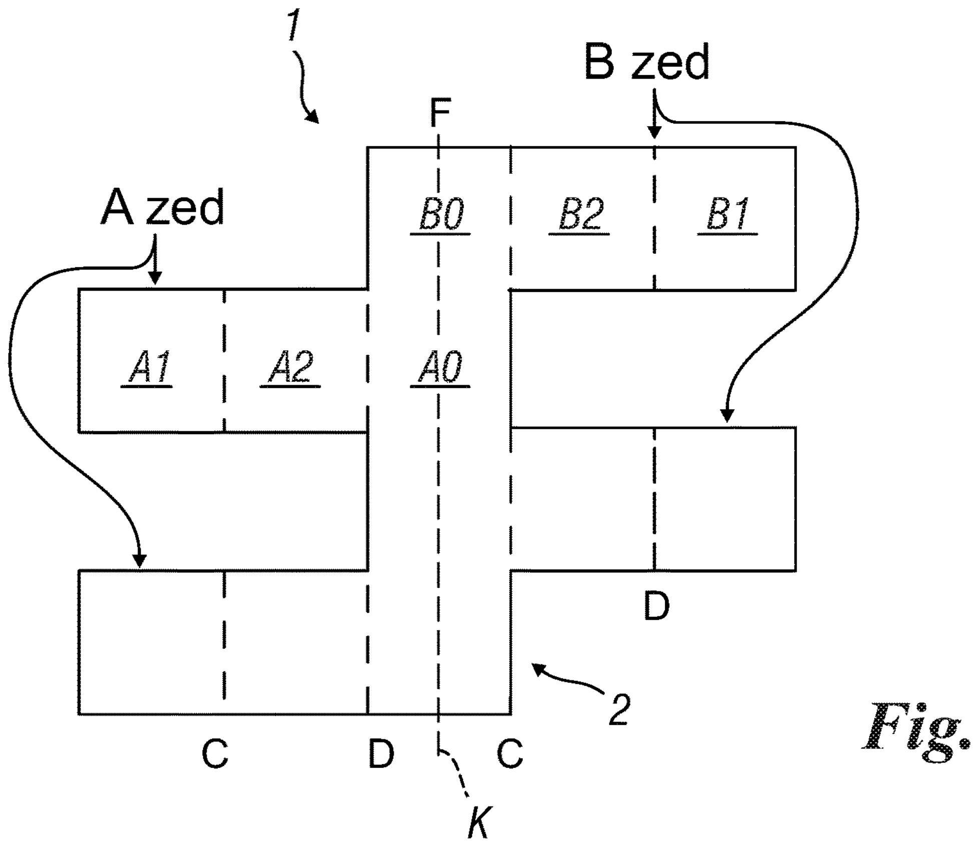
FIG. 2*a* is a schematic view of four segments (among which for two segments, the references A0, A1, A2, B0, B1, B2 of the respective portions are indicated) of a hinge provided with a single body according to an embodiment of the invention in an exemplifying but not exhaustive solution. The central portion indicated by letter F is the portion joining all the segments and is instrumental in maintaining integral the hinge according to the invention during a manufacturing step (monolithic body); two appendages to be folded protrude on the right and other two appendages to be folded protrude on the left of the central portion F. The effective folding points of the invention are indicated by broken lines. Letter C indicates the folds rotating from right to left, and letter D indicates the folds rotating from left to right; left and right are defined according to the orientation of the hinge, particularly of the portions of its body, illustrated in figure.

The hinge 1 comprises, or is formed by, a single-piece body 2 or a plurality of bodies $\mathbf{2}^{I}$, $\mathbf{2}^{II}$, $\mathbf{2}^{III}$, $\mathbf{2}^{IV}$ each of them is configured to be folded in the shape of a "Z". As illustrated in FIG. 2*a*, in the embodiment providing a single body 2, it can comprise a central portion F and appendages A Zed, B Zed transversally emerging from both sides of the central portion; the appendages emerging from a side (in the figures, the appendages B Zed on the right) are apt to form type B folds, while the appendages emerging from the other side (in the figures, the appendages A Zed on the left) are apt to form the type A folds. The body or bodies are preferably made of an elastically deformable material and, in addition or as an alternative, can exhibit a thickness having an order of magnitude of micrometers (microns), for example approximatively 100 micrometers, or of millimeters, as a function of the material. The material of the body/bodies has preferably, besides an elastic deformability, also a determined stiffness required as a function of the application which the hinge is destined to, in order to make the hinge strong. By way of example, the hinge material, particularly of the body/bodies, can be recyclable and/or have a natural origin, for example can be one of: polyvinylchloride (PVC), polyethylene (PET), paper or paperboard, fabric or hides in general.

Figure 1:
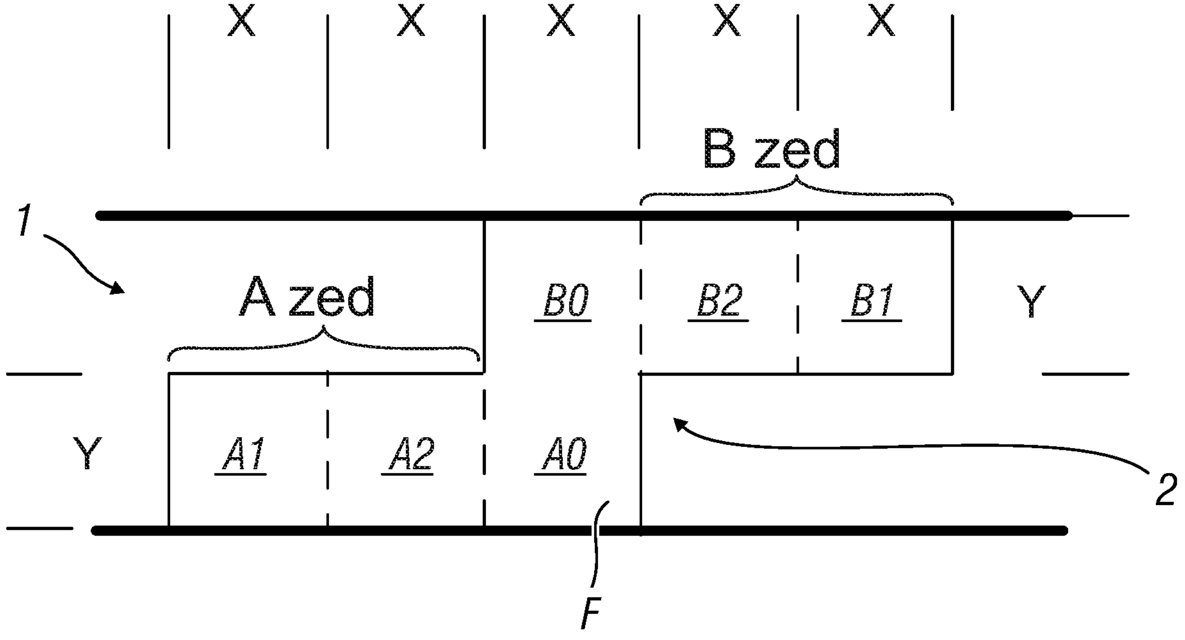
FIG. 1 shows the proportions of the parts of a hinge according to a possible embodiment of the invention, wherein the letter X represents its width which can have a value equal to the thickness of the elements, such as panels, to be hinged, and the letter Y indicates the length of the folds Z (in other words of the portion of the hinge destined to form a "Z" fold). The width X and length Y of the folds can be comprised between 1 millimeter and some centimeters; the width Y can vary, for a same hinge, along the longitudinal development of the same.

FIG. 1 shows the simplest embodiment of the invention, which comprises a hinge 1 with a single-piece body 2 having two portions A Zed, B Zed foldable in the form of a "Z", each of which are apt to engage a respective element 21 to be hinged.

A peculiarity and advantage of the double leaf adhesive hinge 1 is that it can be manufactured, even if not only, continuously by generating a ribbon having variable length and width, obtained by sheet or reel materials. Then, said ribbon is custom cut in order to obtain the dimensions of the body 2 or bodies $\mathbf{2}^{I}$, $\mathbf{2}^{II}$, $\mathbf{2}^{III}$, $\mathbf{2}^{IV}$ required to make the hinge.

The varying length makes the object optimal for the application to panels even of large size (for example to a panel having maximum plan section of 2 meters by 3 meters) enabling to distribute the force determined by the weight and by the protrusion of the panel 21 on all the length of the folds of the joined elements 21. In order to support the weight of the elements or panels 21 which the hinge 1 is engaged with and the structural stresses determined by their movement, the materials of the body/bodies of the hinge 1 and of the adhesive to be used can be suitably selected. The adhesive to be used can be selected based on the type of application, for example on the expected weight of the lightweight elements or panels 21 to be hinged.

Figure 2B:
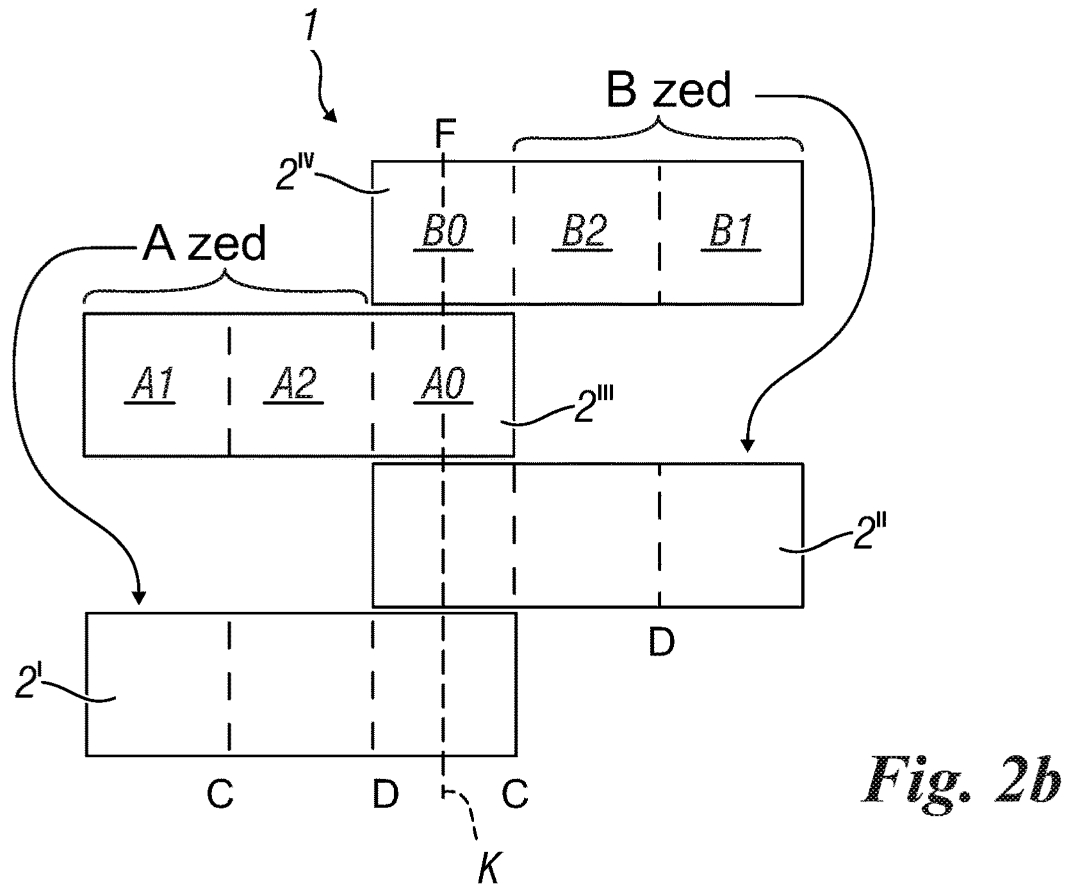
FIG. 2*b* is a schematic view of a hinge provided with a plurality of bodies, each of which is configured and apt to form a respective fold; therefore, the central portion F of the hinge is divided in a plurality of lengths separated from each other, each belonging to a respective body. Conceptually, such hinge is formed by separating the central portion of the hinge in FIG. 2*a* in a number of pieces corresponding to the number of the appendages to be folded.
Figure 3:
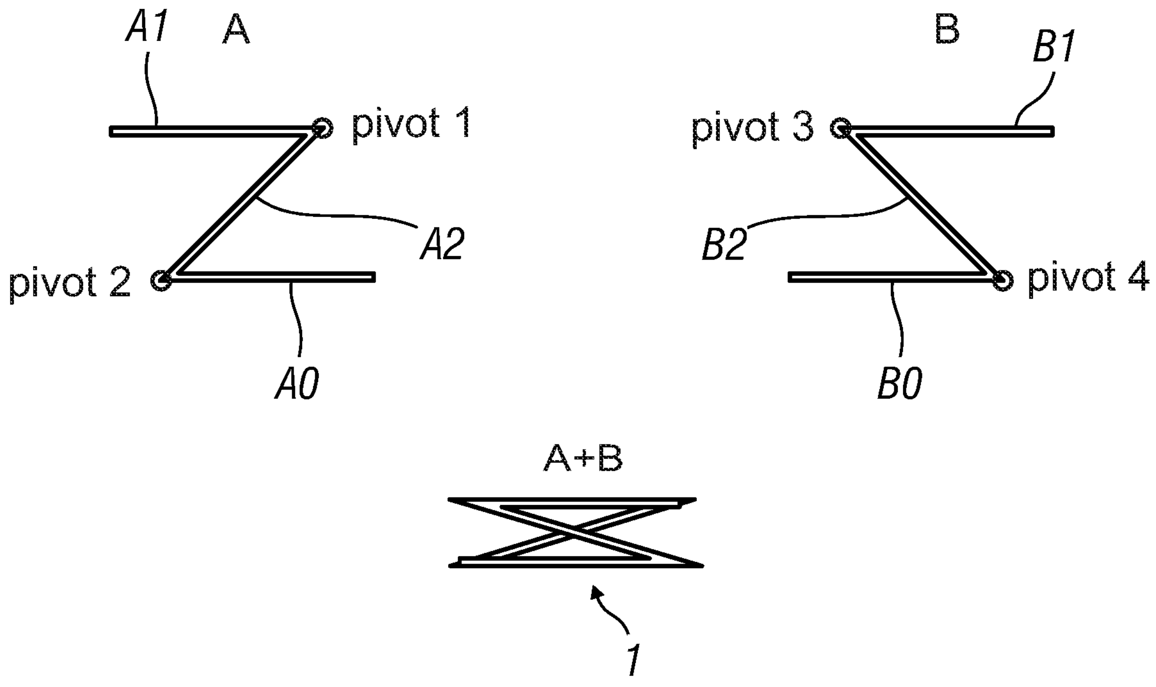
FIG. 3 shows orthogonal views of the hinge according to the invention, indicating the rotation points (or pivots) where, in the bottom portion of the figure, the "Zs" are positioned one after the other (in other words they are alternated or "translated")
Figure 9B:
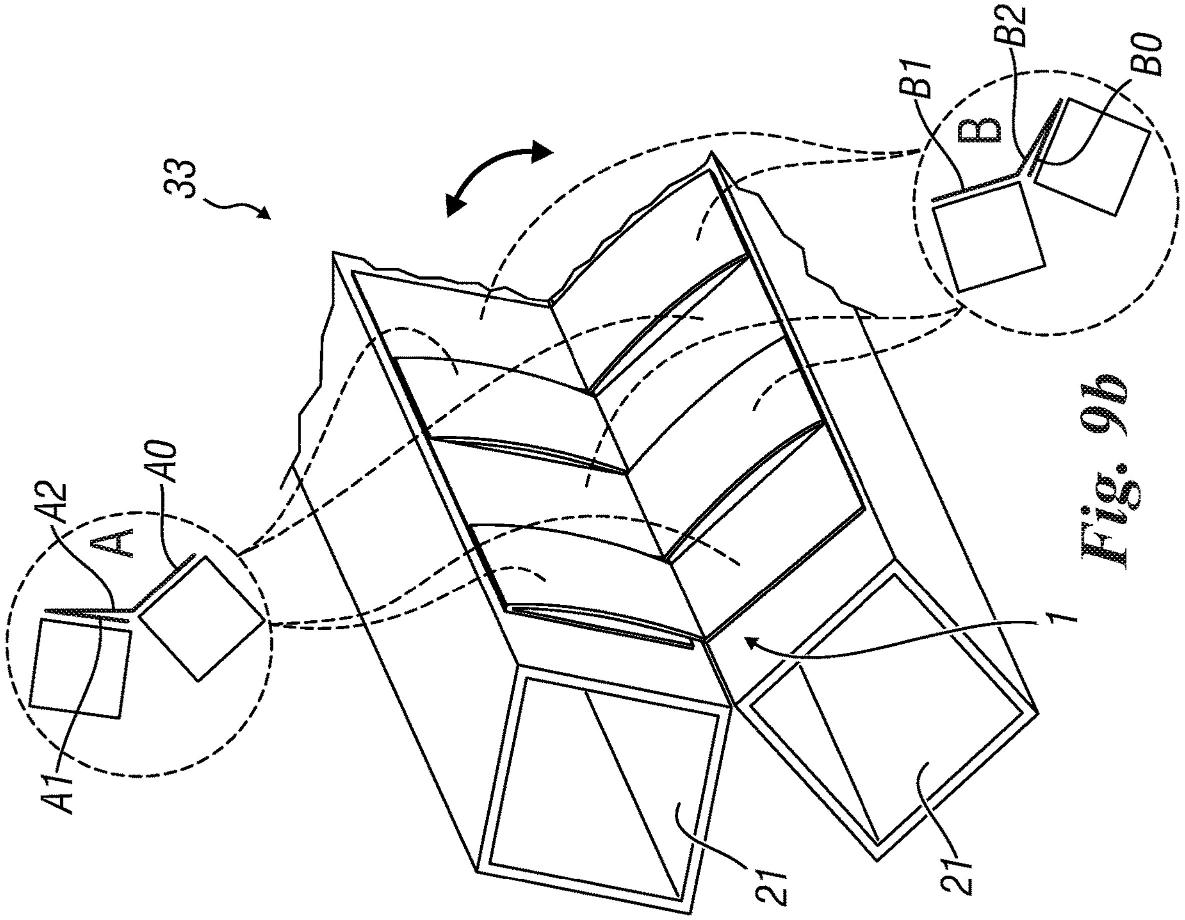
FIG. 9*b* shows a perspective view of the assembly of FIG. 9*a*, wherein the tubular illustrated at the top is further rotated clockwise; such figure, whose configuration is analogous to "B in operation" of FIG. 6, shows the operative configuration of the type B hinge units, with a schematic detail of one of them, and the rest configuration of the type A hinge units, with a schematic detail of one of them. The double headed arrow shows that both the rotation senses are possible; particularly, starting from the configuration in FIG. 9*b* ("B in operation"), the element 21 shown at the top can be rotated clockwise in order to overlap it on the element 21 illustrated at the bottom ("neutral step", see FIG. 6); at this point, the hinge 1 enables to further rotate clockwise such element 21 (during such movement, the type B hinge units switch to the operative configuration) and therefore the assembly takes a configuration analogous to "A in operation" of FIG. 6.
Figure 9A:
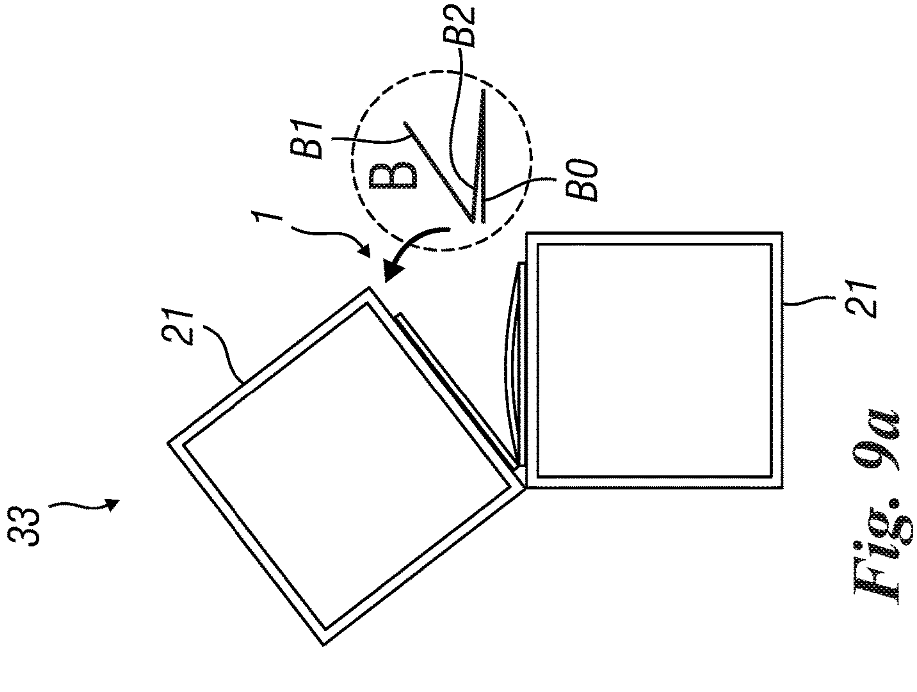
FIG. 9*a* shows an assembly according to the invention wherein the hinge enables a relative rotation of the first and second tubular elements which is engaged with; such figure shows the operative configuration, and a respective schematic detail, of a type B hinge unit. The arc of a circle arrow indicates the anticlockwise rotation sense enabled by the type B hinge unit, which tends to spread the two tubulars about the axis which acts as a rotation fulcrum.
Figure 10A:
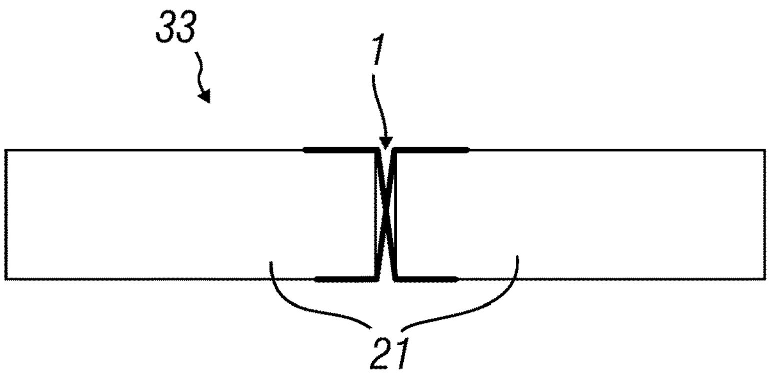
FIGS. 10*a*-10*c* show different attachment positions between hinges according to the invention and quadrilateral cross-section elements; such hinges enable the elements to rotate up to 360°.
Figure 10B:
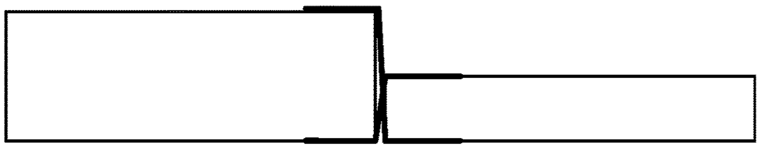
Figure 10C:
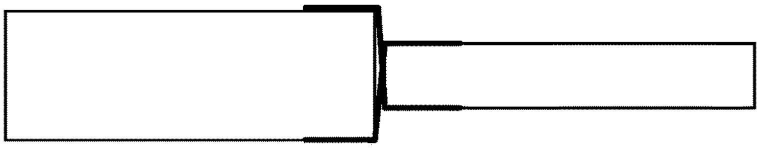
Figure 10D:
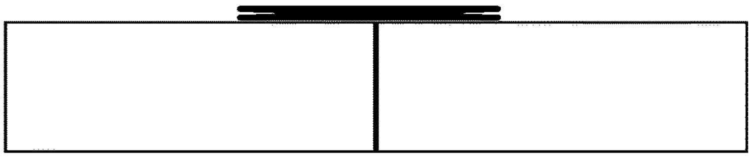
FIGS. 10*d*-10*f* show different attachment positions between hinges according to the invention and quadrilateral cross-section elements; such hinges enable the elements to rotate up to 180°.
Figure 10E:
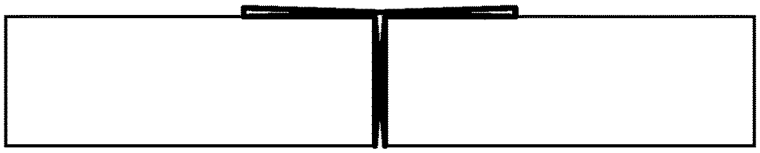
Figure 10F:
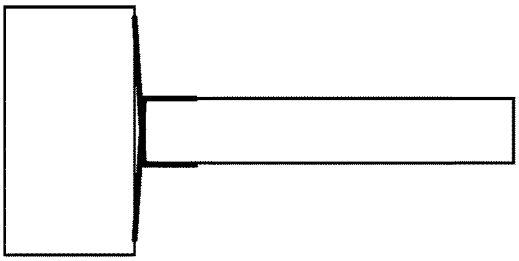
Figure 11A:
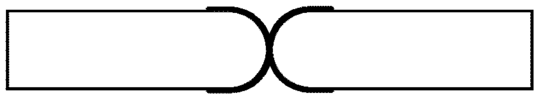
FIGS. 11*a*-11*e* show hinges according to the invention engaged with respective shaped elements. More particularly.
Figure 11B:
Figure 11C:
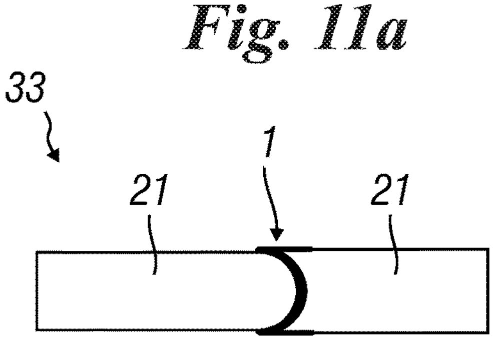
Figure 11D:
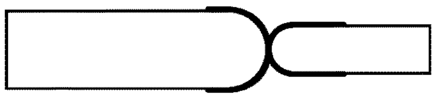
Figure 11E:
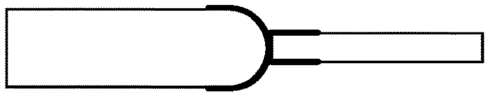
Figure 12A:
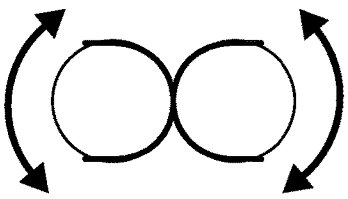
FIGS. 12*a*-12*c* show the engagement of tubulars and panels by hinges according to the invention; therein, the movements of the hinged elements enabled by the hinge are illustrated, by means of arrows. More in detail.
Figure 12B:
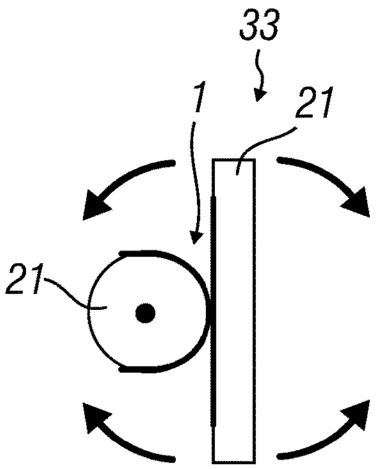
Figure 12C:
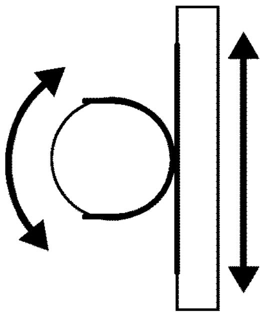

The hinge 1 comprises two types of folds, preferably specular to each other; in this regard, see FIG. 3. The portion in FIG. 3 at the left top indicated by letter A shows a type A fold (in the following known as "type A hinge unit"; it indicates a hinge enabling a type of rotation, preferably a clockwise rotation, of the two hinged elements in order to spread them) formed by the portions of the body A1, A2 in FIG. 1, while the portion of FIG. 3 at the right top indicated by letter B shows a type B fold (in the following, "type B hinge unit"; it indicates a hinge enabling a type of rotation of the two hinged elements in order to spread them, which is opposite to the type of rotation enabled by the type A hinge unit, preferably an anticlockwise rotation) formed by the portions of the body B1, B2 of FIG. 1. The bottom portion of FIG. 3, indicated by A+B, is a back view of the hinge 1 and of the hinge of FIGS. 2*a*, 2*b*, made by folding the portions A1, A2, B1, B2 of the body/bodies; it shows a "translated double Z" hinge in which the "Z" folds are specular to each other. Each type of hinge unit, besides being mainly responsible of the above cited clockwise/anticlockwise rotation, cooperates also in the other anticlockwise/clockwise rotation mainly managed by the other type of hinge unit (see the following description of the configuration of the FIGS. 9*a* and 9*b*). Preferably, the hinge 1 exhibits type A hinge units in a number that is equal to the one of the type B hinge units. Still more preferably, in order to enable a stable rotation, the hinge 1 can comprise at least two type A hinge units and at least two type B hinge units.

The folds of different types of the hinge 1 are longitudinally alternated with respect to each other, in other words are alternated along a longitudinal direction defined by the single body (FIG. 2*a*) or by the arrangement along a longitudinal direction of the bodies (FIG. 2*b*). With reference to hinges 1 in FIGS. 2*a* and 2*b*, after folding said portions A1, A2, B1, B2, two type A hinge units are alternated with two type B hinge units with the following sequence: type A hinge unit, type B hinge unit, another type A hinge unit, another type B hinge unit (such sequence can be deduced from FIGS. 2*a* and 2*b*, by moving from the bottom to the top along the central portion F).

The hinge 1 comprises at least one type A hinge unit configured to enable at least a clockwise rotation of the element which is apt to be engaged with and at least one type B hinge unit configured to enable at least an anticlockwise rotation of the same element which is apt to be engaged with. Each fold is elastically deformable and is configured to operate between an operative configuration wherein it enables a clockwise or anticlockwise rotation of the element and a rest configuration in which the other fold mainly operates in order to enable the anticlockwise or clockwise rotation of the element.

The folds can be arranged and alternated so that consecutive folds (consequently consecutive hinge units) exhibit an interference with each other; the interference enables, in a static condition of the hinge, for example in the condition wherein the hinged elements form an angle of 0° with each other ("closed" elements) or an angle of or about 360° ("open" or "completely spread" elements), to provide an at least partial "lock" which holds the elements in position and can prevent, at least partially, accidental rotations. The interference between longitudinally consecutive hinge units of different types, in condition of use can determine, particularly when the sense of relative rotation of the hinged elements is inverted, a sound which audibly defines substantially a "clack" or "snap"; such sound can provide an evidence of the use of the hinge according to the invention.

Each fold exhibits preferably the shape of a "Z" having a first portion A0, B0, a second portion A1, B1 and an intermediate portion A2, B2 (the diagonal portion of the "Z") joining the first and second portions. The second portion A1, B1 is a guide portion rotatively guiding the element 21 which is engaged with when the corresponding fold is in an operative configuration; for this purpose, see FIGS. 9*a* and 9*b* wherein the second portion B1 of the "type B" fold guides the tubular element which is rotatively engaged with. In such configuration (B in operation), the type A fold cooperates in order to follow the rotation of the tubular element because it is also engaged with the tubular element by means of the first portion A1 and therefore follows its rotation; it is observed that both fold types cooperate, mutatis mutandis (in other words, specularly to what has been just described) with the rotation guided by the guide portion A1 of the type A fold (A in operation). The opposite ends of the intermediate portion A2, B2 are respectively engaged with the first portion A0, B0 and second portion A1, B1 and act as rotation pivots; in this regard, each "Z" fold exhibits two rotation pivots (see FIG. 3). Each fold can be at least partially rounded; particularly, at least the intermediate portion can be rounded (in this regard, see FIGS. 9*a* and 9*b*).

As illustrated in FIGS. 2*a* and 2*b*, the hinge comprises at least two pairs of folding lines, preferably at least four pairs of folding lines p1, p2, p3, p4. Generally, the hinge can comprise a pair of folding lines for each fold to be made; each pair of folding lines cooperate to define a respective "Z" fold and is defined at a same appendage of the single body 2 or of a same body $\mathbf{2}^{I}$, $\mathbf{2}^{II}$, $\mathbf{2}^{III}$, $\mathbf{2}^{IV}$ in case of a plurality of bodies.

Figure 4:
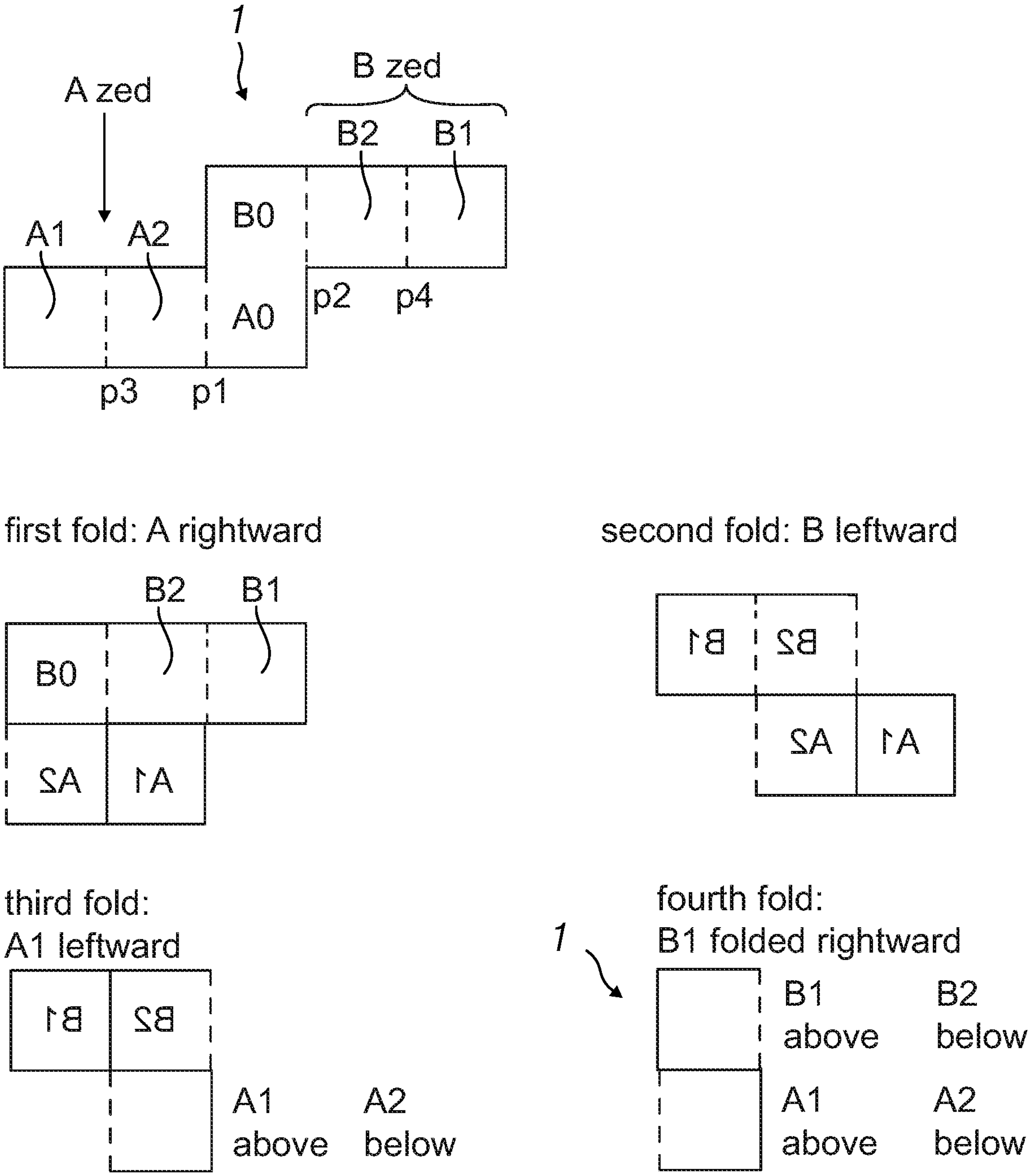
FIG. 4 shows the folding sequence, which enables to make folds of the constituent material, of the single-piece body of the double leaf adhesive hinge according to the invention and the direction in which they are performed so that the pivoted elements can execute a complete rotation even up to 360°. The sequence is part of the process of manufacturing the hinge according to the invention. The first fold is made by turning (folding operation consisting of turning upside down the body portion being moved) all the "Z" of A rightward according to the folding line or point indicated by the abbreviation p1. The second fold refers to all the "Z" of B which is turned (folded and turned upside down) leftward on the folding line or point indicated by the abbreviation p2. The third fold is formed by the part indicated by the abbreviation "A1" of the "Z" of A which is turned (folded, preferably turned upside down) leftward according to the folding line or point indicated by the abbreviation p3. In the fourth, last, fold the part indicated by the abbreviation B1 of the "Z" of B is turned (folded, preferably turned upside down) rightward according to the folding line or point indicated by the abbreviation p4. Such folding steps enable to fold the portions A1, A2, B2, B1 of the appendages of the body; the specular orientation of the abbreviations A1, A2, B2, B1 in FIG. 4 shows how such portions are turned upside down about the folding lines p1, p2, p3, p4.
Figure 5:
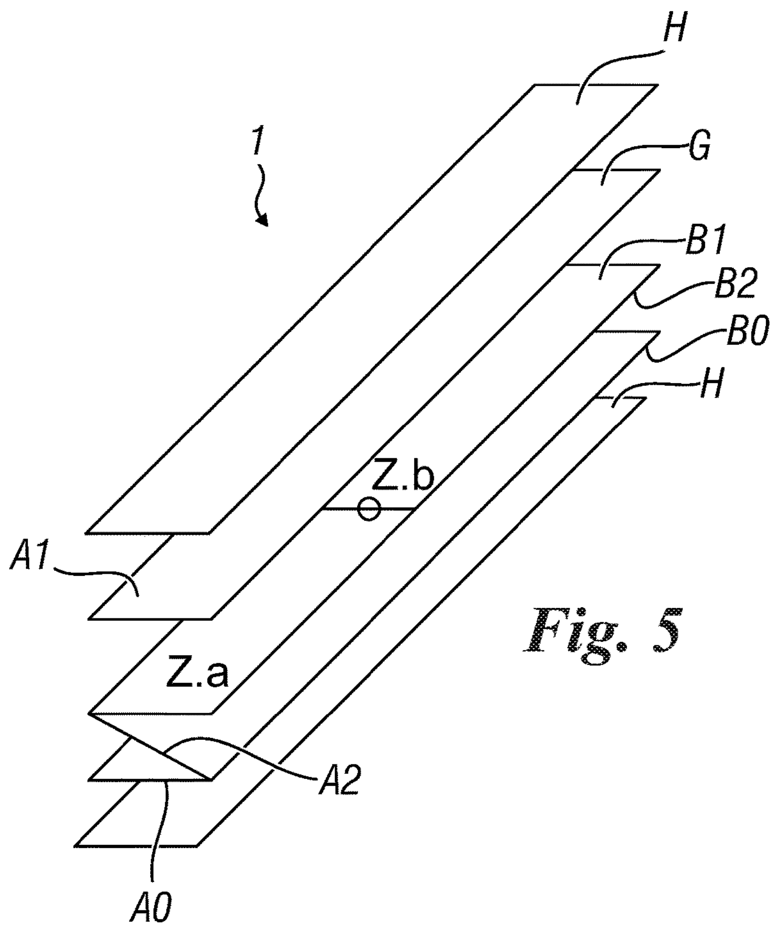
FIG. 5 shows the final passage of the step for manufacturing the double leaf adhesive hinge according to the present invention. It consists of adhesivizing (making adhesive) the body of the hinge object of the invention (preferably by applying adhesive material or by removing a protective film H of an adhesive agent possibly already present on the material forming the body of the hinge according to the invention) the function thereof being of holding integral the loose parts which are formed after the folds as illustrated by letter G in the figure. Other two parts, such as films, whether made adhesive or not (covering, letter H) are present both in the upper part and in the lower part of the body of the hinge object of the invention and they will have the task of keeping the hinge integral to the elements to be hinged.
Figure 6:
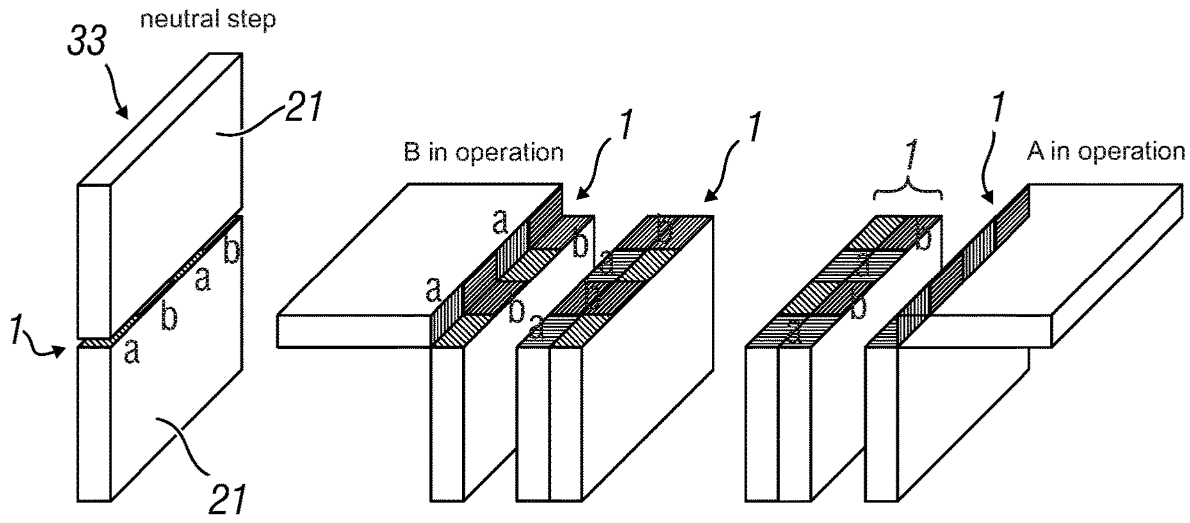
FIG. 6 is an exemplifying view of an application of the present invention to two panels wherein the thickness of these latter forms a grip point (adhesive engagement) for the double leaf adhesive hinge. Therefore.

The modes of folding the hinge 1 having a single body 2 are schematically illustrated in FIG. 4 with reference to an appendage A Zed and an appendage B Zed; the same folding modes can be applied also to a body 2 provided with a plurality of appendages A Zed and a plurality of appendages B Zed (FIG. 2*a*). In the embodiment providing a hinge having plural bodies $\mathbf{2}^{I}$, $\mathbf{2}^{II}$, $\mathbf{2}^{III}$, $\mathbf{2}^{IV}$ (FIG. 2*b*), these can be applied one in proximity of the other and can be folded using techniques identical or analogous to the ones herein disclosed.

Figure 8A:
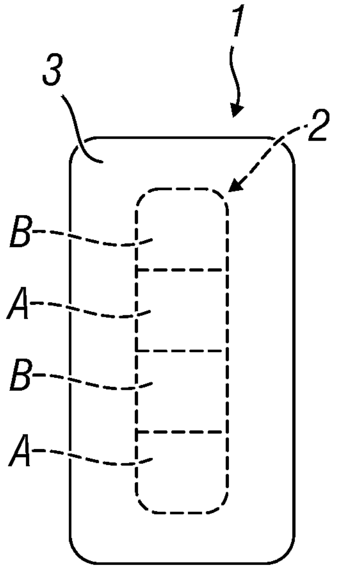
FIGS. 8*a* and 8*b* show two additional adhesive elements, each of which is an optional accessory of the hinge.
Figure 8B:
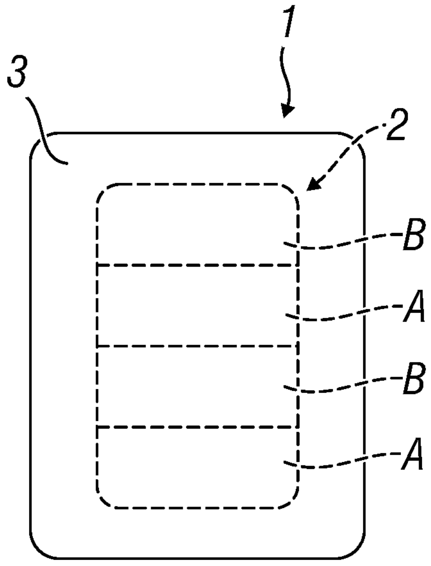

Moreover, the hinge 1 can comprise an additional adhesive element 3 (or reinforcement element) configured to engage the body/bodies of the hinge 1 and apt to be interposed, in use, between one of the elements 21 to be hinged and the lower surface of the body/bodies. It is observed that, in the embodiment providing an additional adhesive element 3, the engagement between the body/bodies and element 21 is an indirect engagement because is mediated by the additional adhesive element 3. The additional adhesive element 3 acts as an intermediate component between the element 21 to be hinged and the body/bodies and facilitates, stabilizes and reinforces the relative engagement. As the dimensions increase, for example the width and length of the additional adhesive element 3, correspondingly the stabilizing effect of the engagement between the hinge 1 and element 21 to be hinged increases; in this regard, see the additional adhesive element 3 in FIG. 8*b* which exhibits dimensions greater than the ones of the additional adhesive element of FIG. 8*a*. FIGS. 8*a* and 8*b* illustrate additional adhesive elements 3 which the body 2 of the hinge 1 is engaged with (the body 2 is drawn by a broken line because is illustrated behind the additional adhesive element 3 and therefore is covered by the latter). Preferably, one of the front and rear surfaces of the additional adhesive element 3 is adhesive in order to enable an adhesive engagement with an element 21; referring to FIGS. 8*a* and 8*b*, the surface in the foreground of the additional adhesive elements 3 is adhesive. Preferably, only one of the front and rear surfaces of the additional adhesive element 3 is adhesive; the engagement between the body/bodies of the hinge 1 and additional adhesive element 3, which occurs at the opposite surface, can be made by the adhesive surface of the body/bodies or in another way. From the point of view of the mode to apply the hinge to an element 21 to be hinged, first of all the additional adhesive element 3 can engage said element 21 and then engages the body/bodies of the hinge 1 to the additional adhesive element 3; alternatively, it is possible to provide an engagement between the additional adhesive element 3 and the body/bodies of the hinge 1, and then to adhesively engage the additional adhesive element 3 with the element 21 to be hinged.

Further, the invention refers to an assembly 33 comprising at least two elements 21 to be hinged and at least one hinge 1, optionally a plurality of hinges 1, of the beforehand described type. The at least one hinge 1 is engaged with such elements 21 in order to hinge them.

Figure 7:
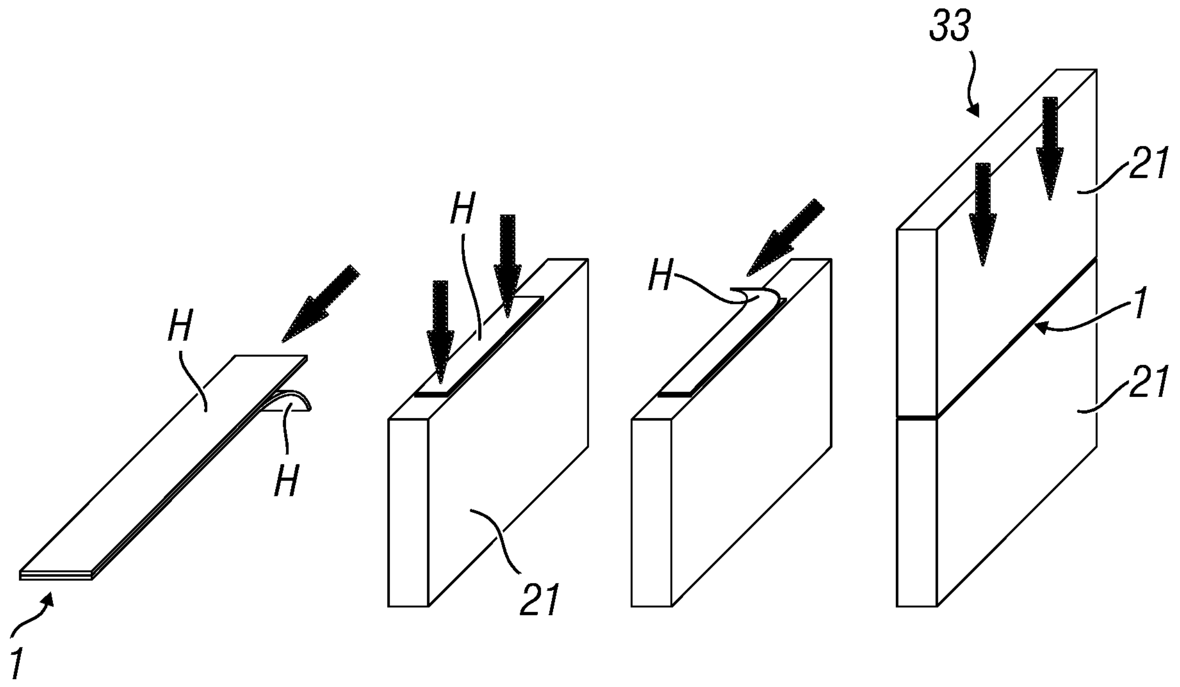
FIG. 7 shows a sequence of steps enabling to put the hinge according to the invention in use (manufacturing the assembly) by adhesive engagement of the hinge to two panels, in order to hinge them. As illustrated, the hinge is preferably double-sided, in other words is adhesive both at the upper and lower surfaces.

Moreover, the invention refers to the use of the hinge 1 to hinge two elements 21; the use envisages adhesively engaging the hinge 1 to at least two elements 21. FIG. 7 shows a sequence of steps enabling to put in use a hinge 1 having a monolithic body 2, which are described in the following by the sequence shown in the figure, from left to right; a cover film H is removed in order to expose the flat adhesive lower surface of the body of the hinge 1, the body of the hinge 1 is adhesively engaged with a first panel 21 at the lower flat surface by exerting a determined pressure, another cover film H is removed at the upper adhesive surface of the body of the hinge 1 and a second panel 21 is then adhesively engaged with the upper adhesive surface of the body of the hinge 1 by exerting a determined pressure. Analogous steps can be performed for each body $\mathbf{2}^{I}$, $\mathbf{2}^{II}$, $\mathbf{2}^{III}$, $\mathbf{2}^{IV}$ of a hinge 1 provided with a plurality of bodies.

Further, the invention refers to a process of manufacturing the hinge, which envisages folding the body/bodies of the hinge according to what was hereinbefore described.

A further advantage of the hinge according to the present invention consists of being adhesive and consequently not requiring any type of mechanical anchorage (screws, bolts, and similar). Hence, the manufacturing the hinge is faster and cost-effective.

A further advantage of the hinge 1 according to the present invention is that it enables to operate by using only the edge (side) of the hinged element 21 without occupying the front and back surfaces. In such embodiment, the body/bodies of the hinge 1 are not engaged at the surfaces of the elements 21 which the hinge 1 is engaged with, transversal to the sides of said elements and the width of the body/bodies can be the same and can be aligned, in use, with the width of the sides of the elements 21. Alternatively, the central portion F of the hinge 1 to be engaged with the element 21 to be hinged (or the additional adhesive element 3 used for engaging the body/bodies to the element 21) can exhibit a width greater than the edge or side of the element 21 and therefore can be engaged at least partially in correspondence of at least one (front or rear) surface transversal to said sides, preferably at both the surfaces transversal to the sides and reciprocally opposite or can simply protrude from the sides in order to form a free edge.

Moreover, the hinge 1 is apt to be applied to portions, such as rectilinear and/or curvilinear edges of the elements to be hinged; anyway, it is preferably apt to follow the rectilinear and/or curvilinear outline of the portions of the elements 21 which is engaged with. As illustrated in FIGS. 10*a*-10*f*, 11*a*-11*e* and 12*a*-12*c*, in which the hinge 1 is illustrated by a line having a thickness greater than the one of the lines of the elements 21, the hinge 1 follows and encompasses the contour of the portions of the elements 21 which is engaged with.

It is has been practically ascertained that the invention meets the specified tasks and objects. Particularly, by the invention, it is set an improved hinge 1 simpler and faster to be assembled than the prior art hinges, due to the body/bodies, particularly the single body 2, made of a shaped material ("comb shaped" with teeth protruding from both the sides of the central portion F, wherein each appendage forms a tooth of the "comb shape") formed by two or more useful folds, by simple operations, to join them by a simple application thanks to the adhesive layer.

Moreover, by the invention, it is set an improved hinge easily manageable not only by a technician by also by anybody in an easy and intuitive way and without using known type tools, such as Allen wrenches and screwdrivers.

The invention, as devised, is susceptible to many modifications and variants, all falling into the scope of the inventive concept; moreover, all the dimensions or constructive details could be modified with other values or technically equivalent solutions.

Substantially, the used components and materials, provided that are compatible with a specific use, and also the contingent dimensions and shapes, could be anyone as a function of the needs and of the state of the art.

The invention as herein shown can be made by any useful material of which can be made the best use according to the requirements or limitations of the context or application which is destined to or must be inserted. Further, it is clearly manufacturable in any shape or dimensions, without falling out, because of it, of the objects of the invention and the scope of the claims.

For example, the number of folds (axes Y), the arrangement of the same and the number of connections/juxtapositions between different components are not herein specifically described, because they can be easily inferred by the person skilled in the art based on the contingent assembly and operative needs.

Herein only the basic or structural components are described, so that the system, in other words the hinge 1 and/or assembly 33 according to the invention, can comprise also further provisions to complete or finish it.

Moreover, it is pointed out the invention finds a particular use in the following fields and/or applications: display cabinets, advertisement boards, signage, do-it-yourself, substantially any hobbies, partitioning walls, substantially any partitioning element, boxes or portions thereof or panels, hatches, temporary or definitive repairs, or any other applications wherein it is required a relative rotational (particularly of revolution) movement between two elements 21. The hinge 1 according to the invention is particularly advantageous because it is adapted both for a temporary use, for example as a temporary repair in view of a definitive future repair or substitution, or for a definitive use. Substantially, the hinge 1 acts as a "universal articulating connector", which is apt to several applications and many uses.

Clearly, the hereinbefore given description of embodiments applying the novel principles of the present invention is disclosed as an exemplifying way of such novel principles and therefore it must not be considered as a limitation of the scope herein claimed. Consequently, without prejudice to the principle of the invention, the embodiments and the constructive details could be extensively changed from what has been described and illustrated, without falling out of the scope of the claims.

The invention claimed is:

1. Double leaf adhesive hinge (1) for fixtures, shutters, hatches, comprising at least one shaped body (2; $\mathbf{2}^{I}$, $\mathbf{2}^{II}$, $\mathbf{2}^{III}$, $\mathbf{2}^{IV}$), the body being a single body (2) or comprising a plurality of bodies ($\mathbf{2}^{I}$, $\mathbf{2}^{II}$, $\mathbf{2}^{III}$, $\mathbf{2}^{IV}$) configured to be arranged in order to form a shape, said at least one body defining a plurality of alternated or alternateable folds (A, B), wherein the hinge (1) is configured to operate a rotational join between two elements (21) to be relatively rotated, such as panels, by using said alternated or alternateable folds (A, B) along a longitudinal direction (K) of the hinge (1), said folds being configured to enable a relative rotation between said elements (21) even up to 360° wherein:

- the hinge (1) is configured to be applied to rectilinear and/or curvilinear edge portions of the elements (21) to be hinged and is configured to extend along the rectilinear and/or curvilinear outline of said portions of the elements (21),
- each fold (A, B) is in the shape of a "Z" having a first portion (A0, B0), a second portion (A1, B1) and an intermediate portion (A2, B2) joining the first portion (A0, B0) and the second portion (A1, B1), the second portion (A1, B1) being a guide portion rotatively guiding the element (21) which is engaged with when the corresponding fold is in an operative configuration, the intermediate portion (A2, B2) having opposite ends that are respectively engaged with the first portion (A0, B0) and second portion (A1, B1), the opposite ends acting as rotation pivots,
- each "Z" fold exhibits two rotation pivots,
- said at least one body (2; $\mathbf{2}^{I}$, $\mathbf{2}^{II}$, $\mathbf{2}^{III}$, $\mathbf{2}^{IV}$) exhibits an alternation of one or more hinge units, the hinge units being defined by said folds (A, B), said folds (A, B) being positioned one opposite to the other with respect to a central portion (F) of said at least one body (2; $\mathbf{2}^{I}$, $\mathbf{2}^{II}$, $\mathbf{2}^{III}$, $\mathbf{2}^{IV}$) and forming a "double Z" system,
- the folds (A, B) are of at least two types and the alternation is defined between folds of said at least two different types,
- the hinge (1) comprises a lower surface, that is smooth and/or substantially flat, configured to be adhesively engaged with one or more of said elements (21) to be relatively rotated and one or more upper surface portions configured to be adhesively engaged with the other of said elements (21) to be relatively rotated, the one or more upper surface portions being defined at said "Z" folds (A, B).

2. Double leaf adhesive hinge, according to claim 1, wherein the hinge (1) is configured to relatively move said elements (21) by a rotation angle greater than 180° and less than or equal to 360°, or by a rotation angle comprised between 300° and 360°, or by a rotation angle substantially equal to 360°.

3. Double leaf adhesive hinge, according to claim 1, wherein the shaped body (2; $\mathbf{2}^{I}$, $\mathbf{2}^{II}$, $\mathbf{2}^{III}$, $\mathbf{2}^{IV}$), or the single shaped body (2), is applicable, by means of a simple adhesive application, to one or more angular or linear sides, of said elements (21) in order to enable to join fixtures, shutters, hatches or similar with specific relative rotation functions of the same.

4. Double leaf adhesive hinge, according to claim 1, wherein each "Z" fold is translated or offset, and not overlapped, on the other "Z" folds.

5. Double leaf adhesive hinge, according to claim 1, wherein the body (2) is in a single piece and comprises a central portion (F) and one or more appendages (A Zed, B Zed) transversally emerging from each side of the central portion (F), the single-piece body (2) being shaped as a comb, with each appendage (A Zed, B Zed) formed by one or more folds and defining a tooth of the comb.

6. Double leaf adhesive hinge, according to claim 1, wherein the body comprises a plurality of bodies ($\mathbf{2}^{I}$, $\mathbf{2}^{II}$, $\mathbf{2}^{III}$, $\mathbf{2}^{IV}$) separated from each other, each of said bodies ($\mathbf{2}^{I}$, $\mathbf{2}^{II}$, $\mathbf{2}^{III}$, $\mathbf{2}^{IV}$) defining at least one respective fold (A, B), the bodies ($\mathbf{2}^{I}$, $\mathbf{2}^{II}$, $\mathbf{2}^{III}$, $\mathbf{2}^{IV}$) being configured to be arranged according to a determined alternation in order to enable the elements (21) to relatively rotate according both to a clockwise rotation and an anticlockwise rotation.

7. Double leaf adhesive hinge, according to claim 1, wherein the hinge (1) is configured to be continuously manufactured, by generating a ribbon or roll having varying length and width, said ribbon or roll being formed by sheet or reel materials with the possibility to be then custom cut.

8. Double leaf adhesive hinge, according to claim 1, wherein the hinge (1) is configured to act on one or more surfaces of the elements (21) which is destined to be engaged with, the hinge (1) configured to not comprise components penetrating inside said elements (21) and not require therefore any type of mechanical invasive anchorage with respect to said elements such as screws, bolts and similar and excluding the use of mechanical means for fixing it such as screwdrivers or Allen wrenches.

9. Double leaf adhesive hinge, according to claim 1, further comprising at least one first fold (A) defining a first type hinge unit configured to enable at least a clockwise rotation of the element (21) which is destined to be engaged with and at least one second fold (B) defining a second type hinge unit configured to enable at least an anticlockwise rotation of the same element (21) which is destined to be engaged with, wherein each fold (A, B) is elastically deformable and is configured to operate between an operative configuration wherein enables the clockwise or anticlockwise rotation of said element (21) and a rest configuration wherein the other fold (B, A) operates in order to enable the anticlockwise or clockwise rotation of said element (21).

10. Double leaf adhesive hinge, according to claim 9, wherein the first type hinge units are substantially specular and/or inverted with respect to the second type hinge units.

11. Double leaf adhesive hinge, according to claim 9, wherein the first type hinge units are in a number equal to the one of the second type hinge units.

12. Double leaf adhesive hinge, according to claim 1, wherein the hinge (1) is double-sided, and has adhesive both at its upper and lower surfaces thereof.

13. Double leaf adhesive hinge, according to claim 1, further comprising an additional adhesive element (3) configured to be engaged with said at least one body (2; 2$^{I}$, 2$^{II}$, 2$^{III}$, 2$^{IV}$) and configured to be interposed, in use, between one of said elements (21) and a lower surface of said at least one body (2; 2$^{I}$, 2$^{II}$, 2$^{III}$, 2$^{IV}$) in order to act as an intermediate component between one of said elements (21) and said at least one body (2; 2$^{I}$, 2$^{II}$, 2$^{III}$, 2$^{IV}$) in order to facilitate the engagement of said at least one body (2; 2$^{I}$, 2$^{II}$, 2$^{III}$, 2$^{IV}$) with said element (21).

14. Assembly (33) comprising:

a pair of elements (21) for fixtures, shutters, hatches, said elements being panels or tubulars, at least one double leaf adhesive hinge (1) comprising at least one shaped body (2; 2$^{I}$, 2$^{II}$, 2$^{III}$, 2$^{IV}$), the body being a single body (2) or comprising a plurality of bodies (2$^{I}$, 2$^{II}$, 2$^{III}$, 2$^{IV}$) configured to be arranged in order to form a shape, said at least one body defining a plurality of alternated or alternateable folds (A, B), wherein the hinge (1) is configured to operate a rotational join between two elements (21) to be relatively rotated, such as panels, by using said alternated or alternateable folds (A, B) along a longitudinal direction (K) of the hinge (1), said folds being configured to enable a relative rotation between said elements (21) even up to 360°, wherein:

the hinge (1) is configured to be applied to rectilinear and/or curvilinear edge portions of the elements (21) to be hinged and is configured to extend along the rectilinear and/or curvilinear outline of said portions of the elements (21), each fold (A, B) is in the shape of a "Z" having a first portion (A0, B0), a second portion (A1, B1) and an intermediate portion (A2, B2) joining the first portion (A0, B0) and the second portion (A1, B1), the second portion (A1, B1) being a guide portion rotatively guiding the element (21) which is engaged with when the corresponding fold is in an operative configuration, the intermediate portion (A2, B2) having opposite ends that are respectively engaged with the first portion (A0, B0) and second portion (A1, B1), the opposite ends acting as rotation pivots, each "Z" fold exhibits two rotation pivots, said at least one body (2; 2$^{I}$, 2$^{II}$, 2$^{III}$, 2$^{IV}$) exhibits one or more hinge units, the hinge units being defined by said folds (A, B), said folds (A, B) being positioned one opposite to the other with respect to a central portion (F) of said at least one body (2; 2$^{I}$, 2$^{II}$, 2$^{III}$, 2$^{IV}$) and forming a "double Z" system, the folds (A, B) are of at least two types and the alternation is defined between folds of said at least two different types, the hinge (1) comprises a lower surface, that is substantially smooth and/or substantially flat, configured to be adhesively engaged with one or more of said elements (21) to be relatively rotated and one or more upper surface portions configured to be adhesively engaged with the other of said elements (21) to be relatively rotated, the one or more upper surface portions being defined at said "Z" folds (A, B), the hinge being configured to join said elements (21) and to make them relatively rotate even up to 360°, wherein the hinge (1) is configured to be adhesively engaged with each of said elements (21).

15. Method of manufacturing a hinge (1) comprising at least one shaped body (2; 2$^{I}$, 2$^{II}$, 2$^{III}$, 2$^{IV}$), the body being a single body (2) or comprising a plurality of bodies (2$^{I}$, 2$^{II}$, 2$^{III}$, 2$^{IV}$) configured to be arranged in order to form a shape, said at least one body defining a plurality of alternated or alternateable folds (A, B), wherein the hinge (1) is configured to operate a rotational join between two elements (21) to be relatively rotated, such as panels, by using said alternated or alternateable folds (A, B) along a longitudinal direction (K) of the hinge (1), said folds being configured to enable a relative rotation between said elements (21) even up to 360°, wherein:

the hinge (1) is configured to be applied to rectilinear and/or curvilinear edge portions of the elements (21) to be hinged and is configured to extend along follow the rectilinear and/or curvilinear outline of said portions of the elements (21), each fold (A, B) is in the shape of a "Z" having a first portion (A0, B0), a second portion (A1, B1) and an intermediate portion (A2, B2) joining the first portion (A0, B0) and the second portion (A1, B1), the second portion (A1, B1) being a guide portion rotatively guiding the element (21) which is engaged with when the corresponding fold is in an operative configuration, the intermediate portion (A2, B2) having opposite ends that are respectively engaged with the first portion (A0, B0) and second portion (A1, B1), the opposite ends acting as rotation pivots, each "Z" fold exhibits two rotation pivots, said at least one body (2; 2$^{I}$, 2$^{II}$, 2$^{III}$, 2$^{IV}$) exhibits one or more hinge units, the hinge units being defined by said folds (A, B), said folds (A, B) being positioned one opposite to the other with respect to a central portion (F) of said at least one body (2; 2$^{I}$, 2$^{II}$, 2$^{III}$, 2$^{IV}$) and forming a "double Z" system, the folds (A, B) are of at least two types and the alternation is defined between folds of said at least two different types, the hinge (1) comprises a lower surface, that is substantially smooth and/or substantially flat, configured to be adhesively engaged with one or more of said elements (21) to be relatively rotated and one or more upper surface portions configured to be adhesively engaged with the other of said elements (21) to be relatively rotated, the one or more upper surface portions being defined at said "Z" folds (A, B), the method comprising the steps of:

predisposing a ribbon of a determined length and width, the ribbon being made of sheet or reel materials, making said at least one body (2; 2$^{I}$, 2$^{II}$, 2$^{III}$, 2$^{IV}$), by shaping the ribbon or a length of ribbon, folding portions (A Zed, B Zed) of said at least one body (2; 2$^{I}$, 2$^{II}$, 2$^{III}$, 2$^{IV}$) in order to obtain the folds (A, B) of the hinge (1), the hinge (1) comprising a pair of folding lines (p1, p2, p3, p4) for each fold that has been made, each pair of folding lines (p1, p2, p3, p4) cooperating to define a respective "Z" fold.

16. Method according to claim 15, further comprising the step of cutting the ribbon for obtaining one or more ribbon lengths.

17. Method according to claim 15, wherein:

the step of folding portions of said at least one body (2; 2$^{I}$, 2$^{II}$, 2$^{III}$, 2$^{IV}$) comprises:

folding a first portion of the body of the hinge (1) according to a clockwise rotation;

folding a second portion of the body of the hinge (1) according to an anticlockwise rotation;

folding the first portion according to an anticlockwise rotation, folding the second portion according to a clockwise rotation.

18. Method according to claim 17:

wherein making said at least one body (2; 2$^{I}$, 2$^{II}$, 2$^{III}$, 2$^{IV}$) comprises making a single-piece body (2) having a central portion (F) and at least one first appendage (A Zed) and at least one second appendage (B Zed) transversally emerging from opposite sides of said central portion (F), the central portion (F) having a longitudinal development and being arranged between the first appendage (A Zed) and the second appendage (B Zed), said first portion being formed by the first appendage (A Zed) and said second portion being formed by the second appendage (B Zed), and wherein:

folding a first portion of the body of the hinge according to a clockwise rotation comprises folding the first appendage (A Zed) towards a surface of a central portion (F), folding a second portion of the body of the hinge according to an anticlockwise rotation comprises folding the second appendage (B Zed) towards said surface of the central portion (F), folding the first portion according to an anticlockwise rotation comprises folding on itself the first appendage (A Zed), folding the second portion according to a clockwise rotation comprises folding on itself the second appendage (B Zed).

19. Method according to claim 15, comprising the step of making adhesive said at least one body (2; 2$^{I}$, 2$^{II}$, 2$^{III}$, 2$^{IV}$) of the hinge (1) in order to prepare it to the engagement with said elements (21) to be relatively rotated.

20. Method according to claim 15, further comprising adhesively engaging the hinge (1) with two elements (21) to be hinged.

* * * * *